(12) United States Patent
Stewart

(10) Patent No.: US 11,459,919 B1
(45) Date of Patent: Oct. 4, 2022

(54) OIL FUNNEL

(71) Applicant: Marcilius C. Stewart, Santa Maria, CA (US)

(72) Inventor: Marcilius C. Stewart, Santa Maria, CA (US)

( * ) Notice: Subject to any disclaimer, the term of this patent is extended or adjusted under 35 U.S.C. 154(b) by 0 days.

(21) Appl. No.: 17/341,623

(22) Filed: Jun. 8, 2021

(51) Int. Cl.
 *F16C 3/14* (2006.01)
 *F01M 11/04* (2006.01)
 *F16N 31/00* (2006.01)

(52) U.S. Cl.
 CPC ......... *F01M 11/0408* (2013.01); *F16N 31/00* (2013.01)

(58) Field of Classification Search
 CPC .............. F01M 11/0408; F01M 11/03; B25B 27/0042; F16N 31/002; B67C 2011/025; B67C 2011/022; A41D 19/0075
 USPC ........................................................ 184/1.5
 See application file for complete search history.

(56) References Cited

U.S. PATENT DOCUMENTS

| | | | | |
|---|---|---|---|---|
| 5,121,776 A * | 6/1992 | Kovach | .............. | F01M 11/0408 383/41 |
| 5,320,145 A * | 6/1994 | Avino | ..................... | B61C 17/08 141/97 |
| 5,803,140 A * | 9/1998 | Jodoin | ..................... | B67C 11/02 141/DIG. 1 |
| 5,852,961 A * | 12/1998 | Kotowski | .......... | F01M 11/0408 81/184 |
| 5,979,516 A * | 11/1999 | Grant | .................. | F01M 11/0408 141/331 |
| 6,196,274 B1 * | 3/2001 | Duncan | .................. | B64D 11/02 588/259 |
| 7,946,317 B1 * | 5/2011 | Organ | ................ | F01M 11/0408 141/331 |

* cited by examiner

*Primary Examiner* — Long T Tran
*Assistant Examiner* — James J Kim
(74) *Attorney, Agent, or Firm* — Suiter Swantz pc llo

(57) ABSTRACT

An oil funnel for use in draining the oil from an automotive engine oil pan. The upper end of the oil funnel is selectively magnetically attached to the bottom of the oil pan around the drain plug thereof. The oil funnel has a semi-circular slot formed therein. A flexible tubular member, having an open outer end and a closed inner end, is positioned in the oil funnel inwardly of the slot. The user of the oil funnel may insert the user's thumb, index finger and perhaps the user's middle finger inwardly through the slot and into the interior of the tubular member whereby the user may remove the drain plug from the oil pan without coming into direct contact with the drain plug. The flexible tubular member prevents the draining oil from coming into contact with the user's hand.

12 Claims, 10 Drawing Sheets

OIL FUNNEL

BACKGROUND OF THE INVENTION

Field of the Invention

This invention relates to an oil funnel. More particularly, this invention relates to an oil funnel for use in draining the oil from an automotive engine oil pan. Even more particularly, this invention relates to an oil funnel which permits the oil to be drained from an automotive engine oil pan without the user coming into direct contact with the drain plug or the oil being drained from the oil pan.

Description of the Related Art

When the oil in an automotive engine oil pan is to be drained therefrom, the drain plug located at the bottom of the oil pan must be threadably removed therefrom. What usually happens is that when the drain plug is threadably removed from the oil pan, the person draining the oil from the oil pan will come into contact with the oil draining from the oil pan thereby creating a mess.

Valves have been provided to replace the drain plugs but they extend downwardly from the oil pan and are subject to being struck by rocks or other debris which may damage the valve beyond repair. Further, it could be possible that the valves could be torn from the oil pan resulting in engine damage due to the lack of oil in the oil pan. Further, the valves are expensive.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An oil funnel is provided for use in the draining of oil from an automotive engine oil pan, having a lower end, and which has a drain plug selectively closing an oil drain opening in the lower end of the oil pan. The oil funnel includes an upstanding and truncated conical-shaped hollow funnel portion having an open lower end and an open upper end. A plurality of horizontally disposed and radially spaced-apart magnetic plates extend outwardly from the upper end of the hollow funnel portion for selective magnetic engagement with the lower end of the oil pan around the drain plug and the oil drain opening thereof.

The hollow funnel portion has a horizontally disposed and semi-circular slot, having an upper end, a lower end, a first end and a second end extending into the hollow funnel portion below the upper end of the hollow funnel portion. The funnel also includes a horizontally disposed and elongated flexible tubular member having an open outer end and a closed inner end. The outer end of the flexible tubular member is secured to the upper end, the lower end, the first end and the second end of the slot. The inner end of the flexible tubular member is crescent-shaped so that a drain opening is created between the inner end of the flexible tubular member and the conical-shaped funnel portion. Initially, the drain plug is partially loosened in the drain opening of the oil pan with a wrench. The loosening of the drain plug does not permit any engine oil to flow downwardly through the drain opening in the oil pan.

The upper end of the conical-shaped hollow funnel portion is then raised with respect to the oil pan so that magnetic plates are magnetically attached to the oil pan with the drain plug being positioned within the open upper end of the hollow funnel portion.

The elongated and flexible tubular member is accessible from the semi-circular slot whereby the flexible tubular member may be physically moved inwardly so that a person may insert the person's thumb, index finger and possibly the person's middle finger around the drain plug without coming into direct contact with the drain plug. The person then manually threadably removes the drain plug from the drain opening in the oil pan whereby the oil in the oil pan drains downwardly through the hollow funnel portion and outwardly from the lower end of the hollow funnel portion into a suitable container or receptacle. When the drain plug has been threadably removed from the drain opening in the oil pan, the person simply loosens the person's grip on the drain plug so that the drain plug drops downwardly onto a perforated screen in the hollow funnel portion. If the oil pan is comprised of aluminum, the magnetic plates will not magnetically adhere to the underside of the aluminum oil pan. In that case, a plurality of magnetically attractive discs, comprised of iron or the like, are secured to the underside of the aluminum oil pan by double-sided tape with those discs being aligned with the magnetic plates which extend outwardly from the upper end of the hollow funnel portion so that magnetic plates may be magnetically secured to the discs to yieldably maintain the oil funnel in its upper oil collection position. When the oil has been drained from the aluminum oil pan, sufficient downward force is applied to the hollow funnel portion to separate the magnetic plates from the discs.

It is therefore seen that a novel oil funnel has been provided which permits a person to drain the oil from an automotive engine oil pan without coming into contact with the oil being drained.

It is therefore a principal object of the invention to provide an oil funnel for use in the draining of oil from an automotive engine oil pan which prevents the oil being drained from the oil pan to come into direct contact with the person draining the oil from the oil pan.

A further object of the invention is to provide an oil funnel of the type described which is easy to use.

A further object of the invention is to provide an oil funnel of the type described which catches the drain plug after it has been removed from the drain opening in the oil pan.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
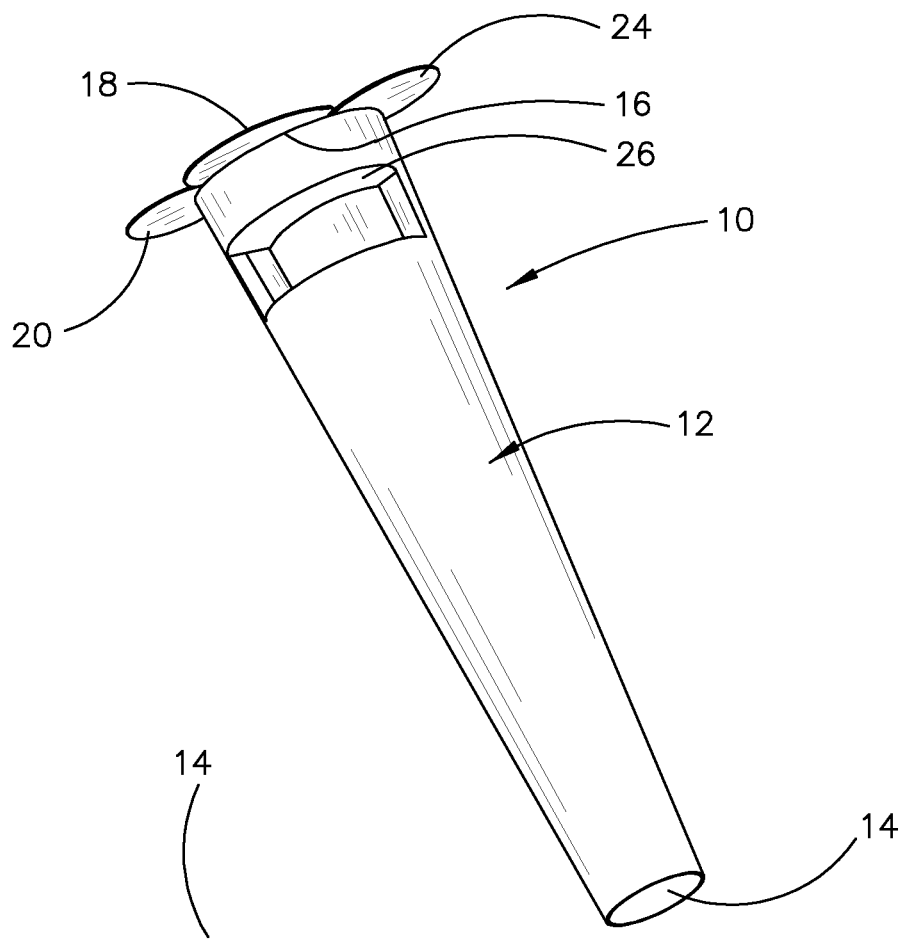
FIG. 1 is a lower perspective view of the oil funnel of this invention.
Figure 2:
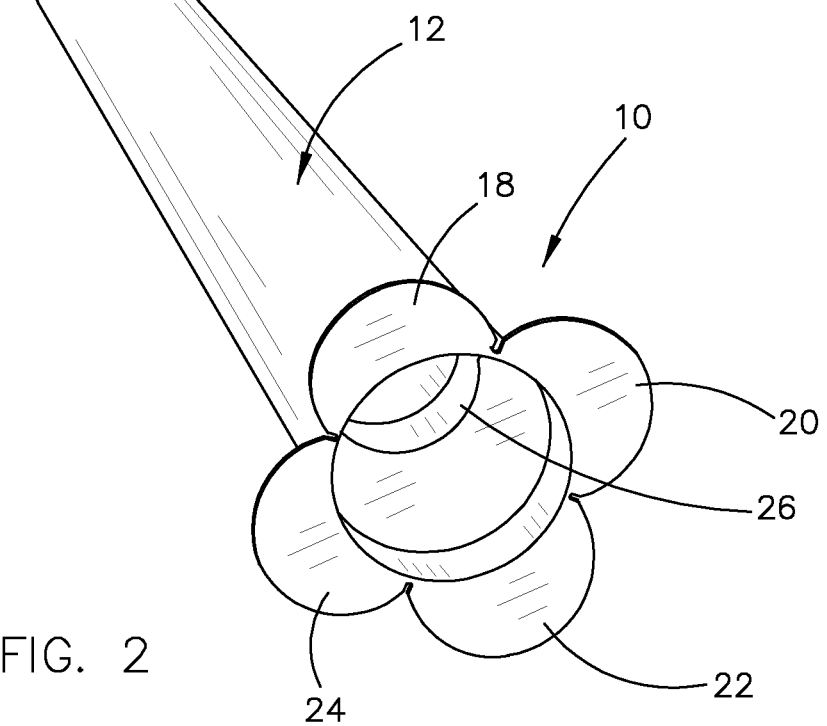
FIG. 2 is an upper perspective view of the oil funnel of this invention.
Figure 3:
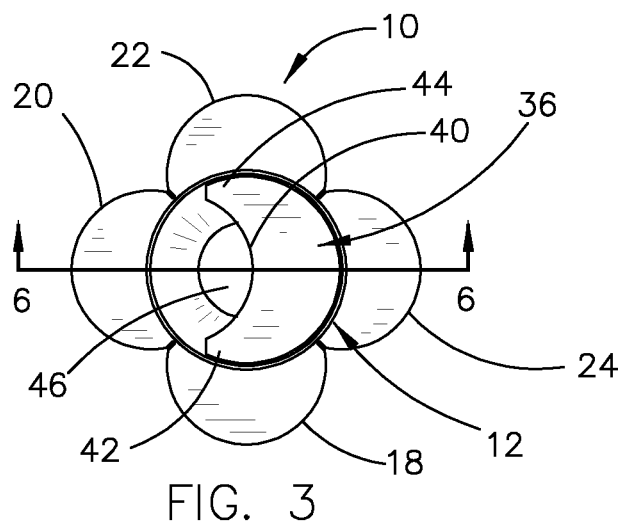
FIG. 3 is a top view of the oil funnel of this invention.
Figure 4:
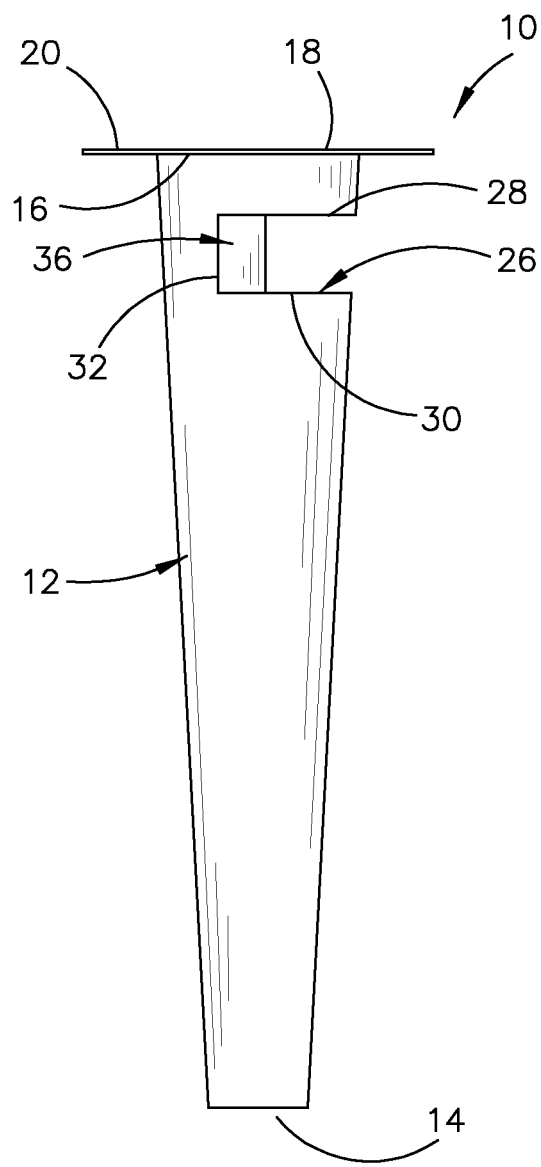
FIG. 4 is a side view of the oil funnel of this invention.
Figure 5:
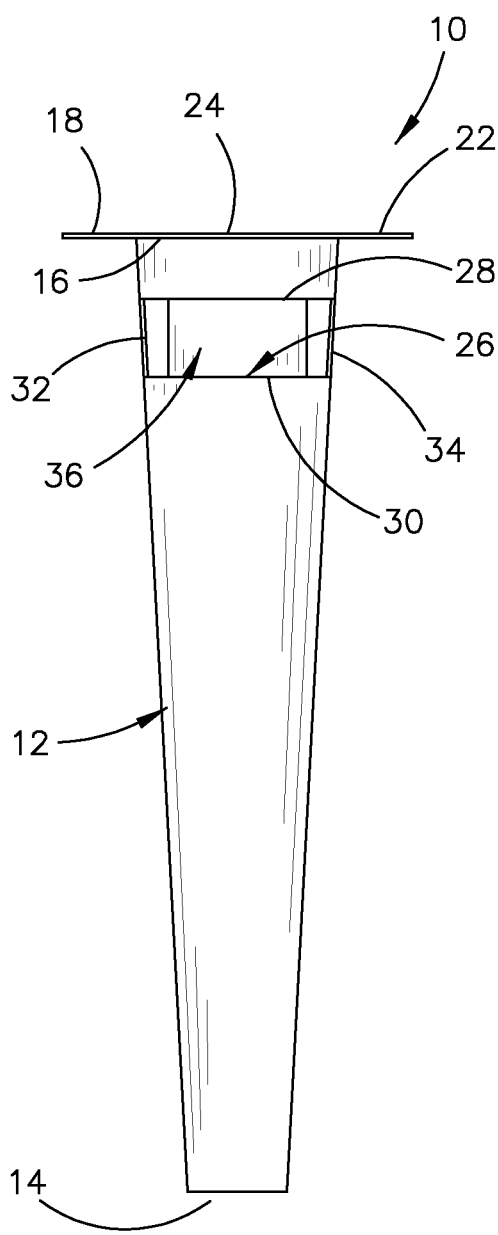
FIG. 5 is another side view of the oil funnel of this invention.
Figure 6:
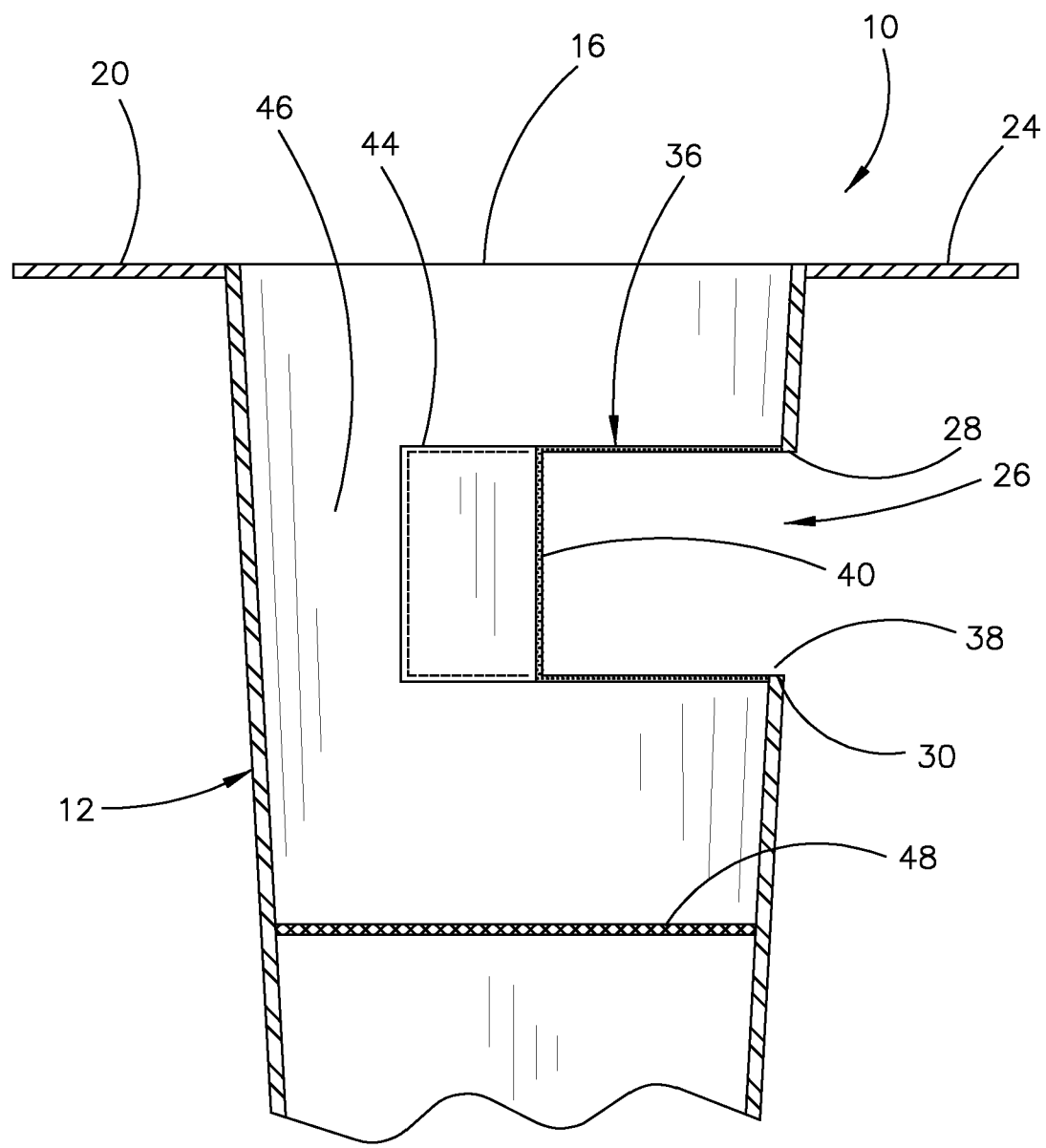
FIG. 6 is a sectional view of the oil funnel of this invention as seen on lines 6-6 of FIG. 3 with the broken lines illustrating the inner positioning of a flexible tubular tube which provides a glove or shield for the person draining the oil from an automotive engine oil pan.

The oil funnel of this invention is referred to by the reference numeral 10. Oil funnel 10 includes a truncated conical-shaped hollow funnel portion 12 having a lower open end 14 and an upper open end 16. Funnel portion 12 is preferably comprised of a plastic material such as TPE silicone. Four plastic covered and semi-circular magnetic plates 18, 20, 22 and 24 extend horizontally outwardly from the exterior of funnel portion 12 at the upper end thereof. The magnetic plates 18, 20, 22 and 24 do not restrict the open upper end 16 of funnel portion 12. Funnel portion 12 has a semi-circular slot 26 formed therein. Slot 26 has an upper end 28, a lower end 30, a first side edge 32 and a second side edge 34. The numeral 36 refers to a flexible tubular member which has an open outer end 38 and a closed inner end 40. Preferably, tubular member 36 is comprised of a plastic material. The outer end 38 of tubular member 36 is secured to the upper end 28, the lower end 30, the first side edge 32 and the second side edge 34 of slot 26. The inner end 40 of tubular member 36 is crescent-shaped as seen in FIG. 3 with the wings 42 and 44 thereof defining a vertical opening 46 therebetween. A perforated screen 48 is positioned in funnel portion 12 below the tubular member 36 and extends between the side walls of funnel portion 12.

The oil funnel 10 of this invention is configured to be used with an automotive engine oil pan 50 having a drain plug 52 threadably mounted in a drain opening 54 formed in the bottom 56 of the oil pan 50, having oil 58 therein, as will now be described.

Preferably, the length of the oil funnel 10 is about 12.80 inches. Preferably, the diameter of the lower end 14 of the funnel portion 12 is about 1.36 inches. Preferably, the diameter of the upper end 16 of the funnel portion 12 is about 2.70 inches. Preferably, the width of the slot 26 is about 1.08 inches. Preferably, each of the plates 18, 20, 22 and 24 has a radius of 1.07 inches. Preferably, the distance between the outer ends of plate 18 and 22 is about 4.70 inches. Preferably, the distance between the outer ends of plates 20 and 24 is about 4.70 inches. Preferably, the plates 18, 20, 22 and 24 are embedded in plastic.

Figure 7:
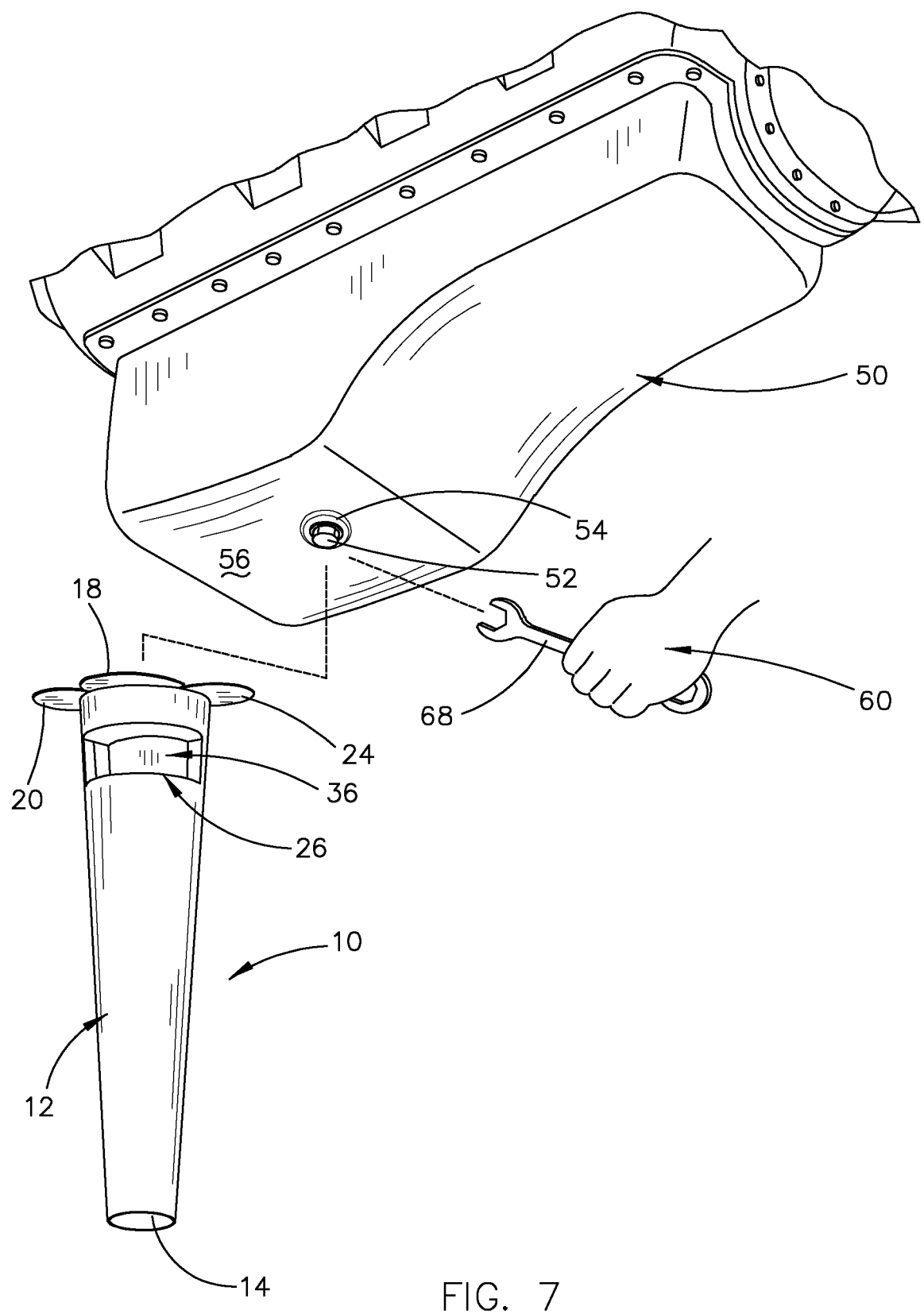
FIG. 7 is a perspective view illustrating the position of the oil funnel as the oil plug is being initially threadably loosened.
Figure 8:
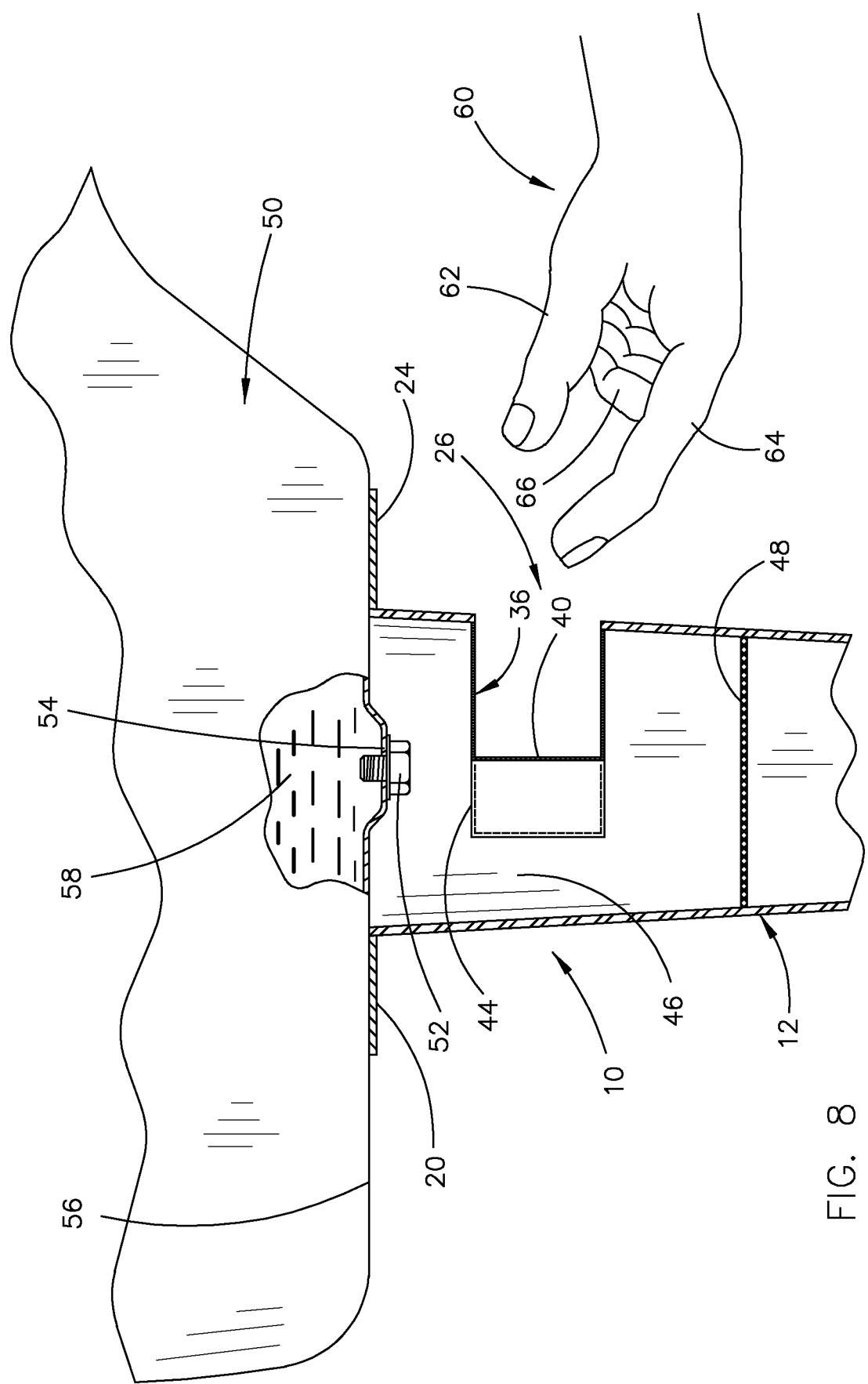
FIG. 8 is a partial sectional view illustrating the hand of the person draining the oil from the oil pan about to be inserted into the slot in the side of the conical-shaped funnel portion of the oil funnel with the broken lines illustrating the inner position of the flexible shield or glove to enable the person to grasp the drain plug.
Figure 9:
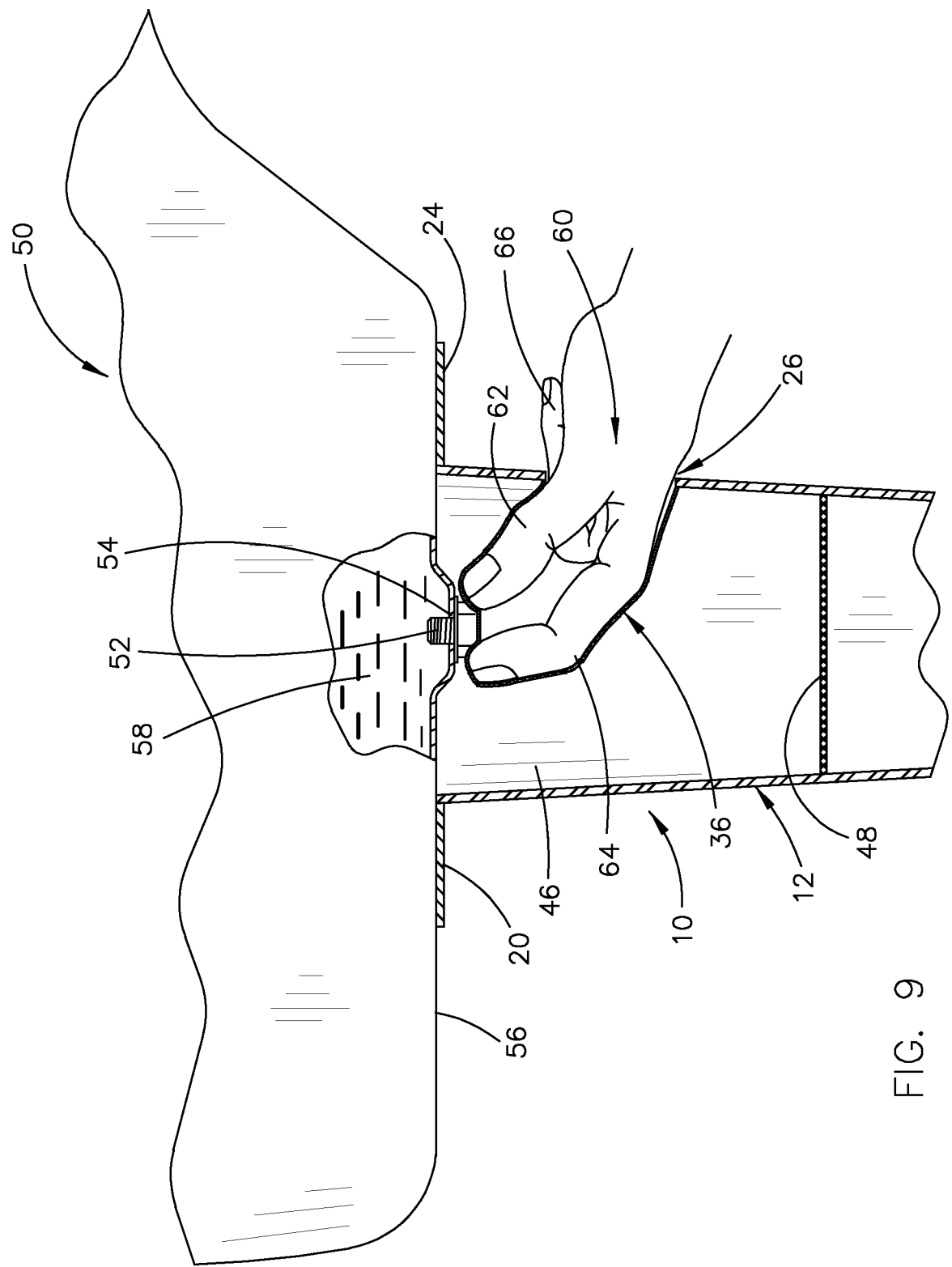
FIG. 9 is a partial sectional view similar to FIG. 8 except that the person has moved the flexible shield or glove inwardly and upwardly from the position of FIG. 8 so that the person may grasp the drain plug to further threadably loosen the drain plug with respect to the oil pan.
Figure 10:
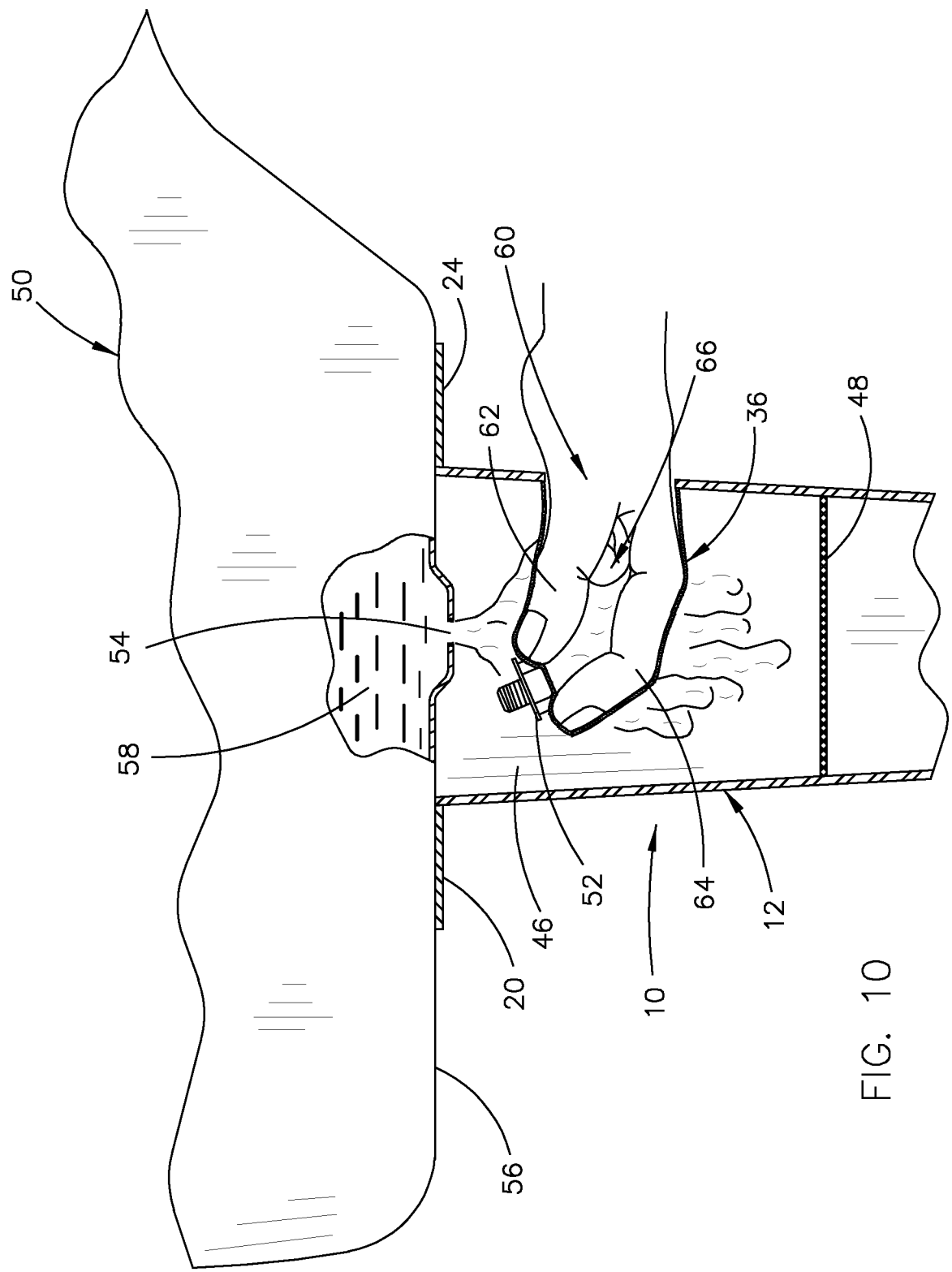
FIG. 10 is a partial sectional view similar to FIG. 9 except that the person has removed the drain plug from the oil with the flexible shield or glove preventing the draining oil from coming into direct contact with the person's hand.
Figure 11:
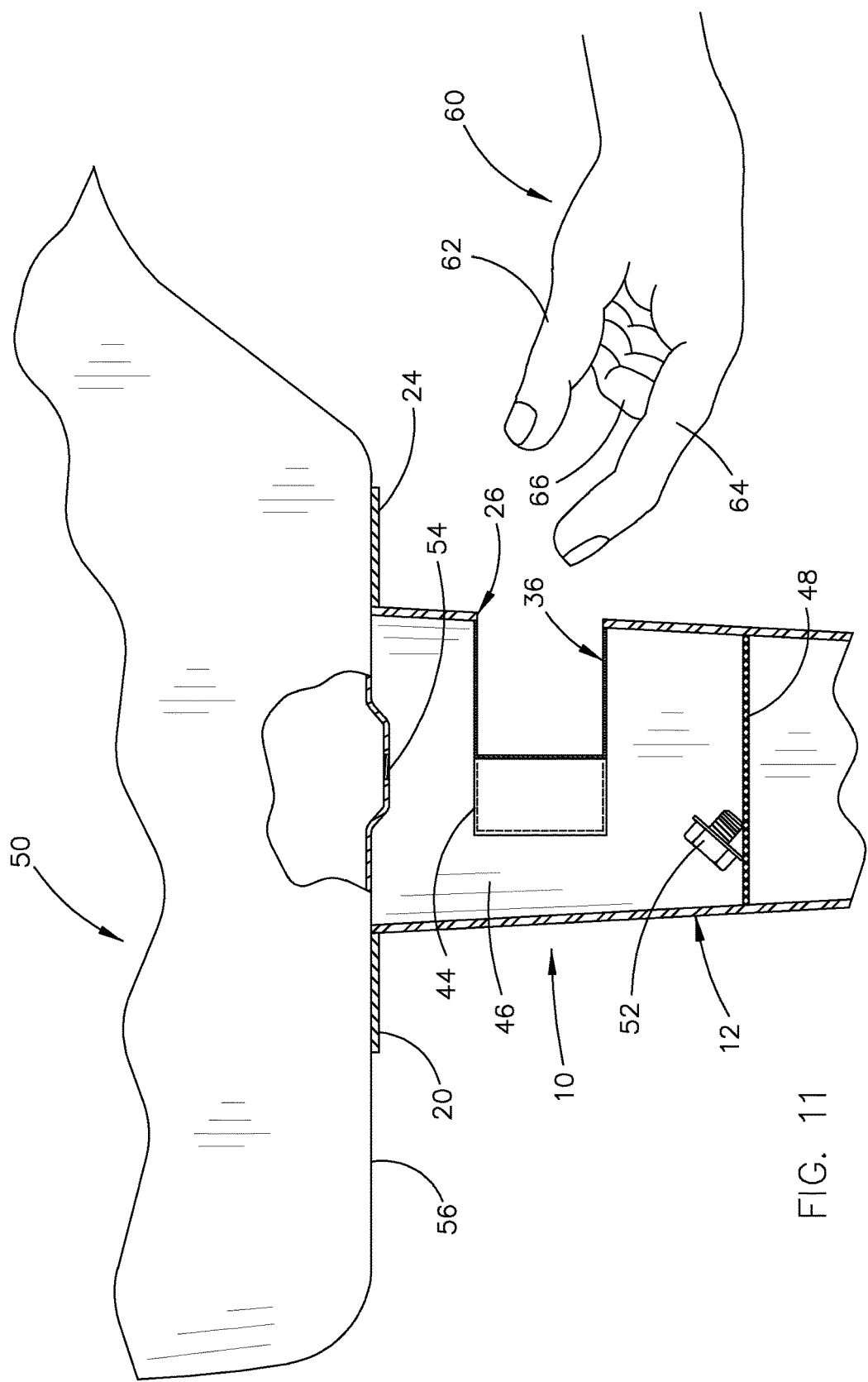
FIG. 11 is a partial sectional view similar to FIG. 10 except that the person has dropped the drain plug so that it falls onto a screen and the person has withdrawn the person's hand from the slot in the conical-shaped funnel portion without coming into direct contact with the oil being drained from the oil pan.
Figure 12:
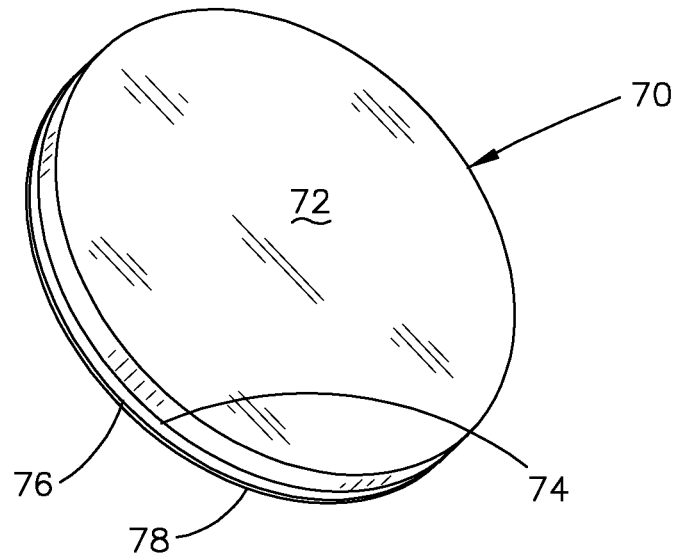
FIG. 12 is a bottom perspective view of one of the metal discs which are secured to the underside of an aluminum oil pan.

For descriptive purposes, the numeral 60 refers to a person's hand including a thumb 62, index finger 64 and middle finger 66. The numeral 68 refers to a commonly used wrench. The drain plug 54 is loosened somewhat by the use of the wrench 68 without any oil 58 leaking from the drainage opening 54. The funnel 10 is then positioned below the drain plug 54 as seen in FIG. 7. The funnel 10 is then raised upwardly from the position of FIG. 7 to the position of FIG. 8 so that the magnetic plates 18, 20, 22 and 24 are magnetically attracted and secured to the bottom 56 of the oil pan 50 with the drain plug 52 being centrally received in the open upper end 16 of funnel portion 12. The person then inserts the person's thumb 62, index finger 64 and perhaps the middle finger 66 into the slot 26 and into the open outer end 38 of the flexible tubular member 36 as seen in FIG. 9. The person then grasps the loosened drain plug 52 and further loosens the drain plug 52 until the drain plug 52 is completely removed from the drain opening 54 as seen in FIG. 10. The person then drops the drain plug 52 which falls onto the screen 48. The oil 58 then drains downwardly through the drain opening 54 as seen in FIG. 10. The oil draining from the drain opening 54 passes downwardly through the opening 46 without coming into direct contact with the person's fingers or hand since the person's fingers are enclosed in the tubular member 36. The oil 58 drains from the lower end 14 of the funnel portion 12 into a suitable container.

When the oil drain procedure has been completed, the magnetic plates 18, 20, 22 and 24 are disengaged from the bottom 56 of the oil pan 50. The drain plug 52 is then threadably inserted into the drain opening 54.

Figure 13:
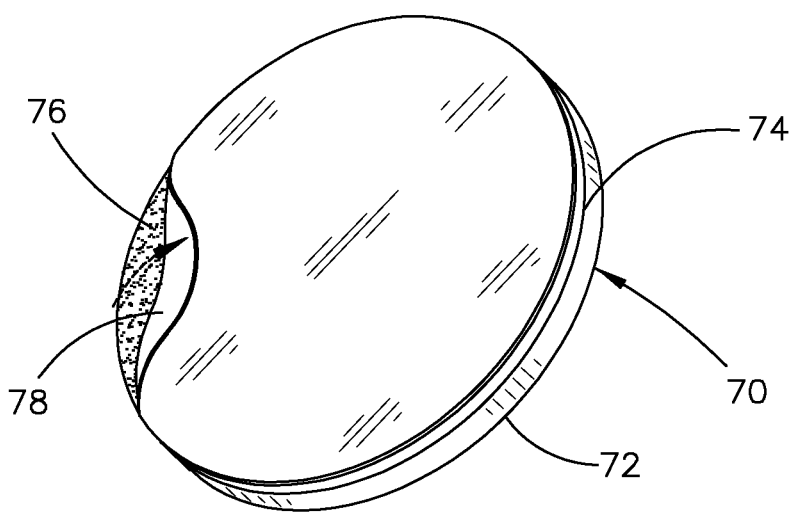
FIG. 13 is an upper perspective view of the disc of FIG. 12.
Figure 14:
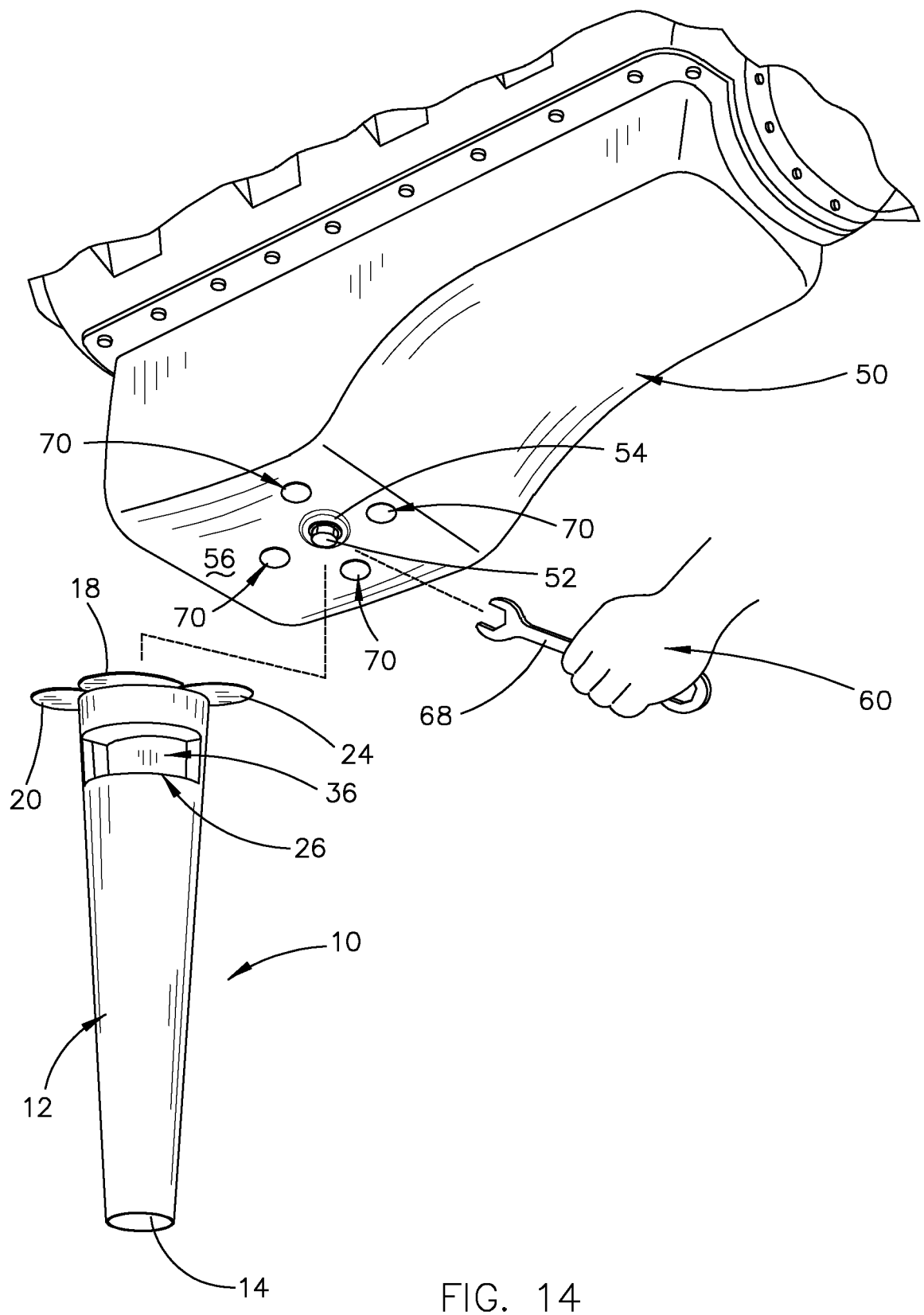
FIG. 14 is a partial lower perspective view illustrating a plurality of the discs of FIGS. 12 and 13 secured to the underside of an aluminum oil pan.

As stated above, if the oil pan 50 is aluminum, the magnetic plates 18, 20, 22 and 24 will not magnetically adhere to the oil pan 50. In that case, Applicant has provided a system to allow the oil funnel 10 to be secured to the aluminum oil pan. Applicant's system involves a plurality of magnetically attractive flat discs 70 comprised of iron or the like. Each of the flat discs 70 include a lower side 72 and an upper side 74. A double-sided adhesive tape 76 has its lower side adhesively secured to the upper side 74 of each of the discs 70. The upper side of each of the double-sided adhesive tape 76 has a flexible sheet, tape or liner 78 selectively covering the upper side of the tapes 76. When it is desired to attach the discs 70 to the underside of the aluminum oil pan, the tape liners 78 are peeled from the upper side of the tapes 76 as shown in FIG. 13 to expose the upper side of the double-sided adhesive tape 76. The discs 70 are then pressed onto the underside of the aluminum oil pan. The discs 70 are then attached to the underside of the oil pan in the manner as seen in FIG. 14. The discs 70 will be attached to the aluminum oil pan so as to be aligned with each of the magnetic plates 18, 20, 22 and 24. When so positioned, the oil funnel 10 will be raised with respect to the oil pan so that the magnetic plates 18, 20, 22 and 24 will magnetically adhere to the discs 70.

When the oil draining procedure has been completed, sufficient downward force is applied to the hollow funnel portion 12 to separate the magnetic plates 18, 20, 22 and 24 from the discs 70.

Thus, it can be seen that a novel oil funnel 10 has been provided which enables a person to drain the oil from an automotive engine oil pan 50 without ever coming into direct contact with any of the oil being drained from the engine oil pan 50.

Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An oil funnel for use in the draining of oil from an automotive engine oil pan, having a lower end, and which has a drain plug selectively closing an oil drain opening in the lower end of the oil pan, comprising:

an upstanding and truncated conical-shaped hollow funnel portion having an open lower end and an open upper end;

a plurality of horizontally disposed and radially spaced magnetic plates extending outwardly from said upper end of said hollow funnel portion for selective magnetic engagement with the lower end of the oil pan around the drain plug and the oil drain opening thereof;

said hollow funnel portion having a horizontally disposed and semi-circular slot, having an upper end, a lower end, a first side and a second side, extending into said hollow funnel portion below said upper end of said hollow funnel portion;

said semi-circular slot being configured to permit the person draining the oil from the engine oil pan to at least insert the person's thumb and index finger into said slot;

a flexible tubular member positioned in said hollow funnel portion inwardly of said semi-circular slot;

said flexible tubular member having an open outer end, a closed inner end and an interior;

said outer end of said flexible tubular member being joined to said upper end, said lower end, said first side and said second side of said semi-circular slot; and said interior of said flexible tubular member being accessible by way of said semi-circular slot whereby a portion of said flexible tubular member may be physically moved in said hollow funnel portion by a person inserting a portion of the person's hand thereinto to grasp the drain plug without coming into direct contact with the drain plug to remove the drain plug from the drain opening in the oil pan and so that oil draining from the drain opening, after the drain plug has been removed from the drain opening, will not come into direct contact with the person's fingers or hand as the draining oil passes downwardly through said hollow funnel portion.

2. The oil funnel of claim 1 wherein said hollow funnel portion and said flexible tubular member are comprised of a plastic material.

3. The oil funnel of claim 1 wherein said magnetic plates may be embedded in a plastic material.

4. The oil funnel of claim 1 wherein a horizontally disposed and perforated screen is positioned in said hollow funnel portion below said semi-circular slot to catch the drain plug after it has been removed from the drain opening.

5. An oil funnel for use in the draining of oil from an automotive engine oil pan, having a lower end, and which has a drain plug selectively closing an oil drain opening in the lower end of the oil pan, comprising:

an upstanding and truncated conical-shaped hollow funnel portion having an open lower end and an open upper end;

a plurality of horizontally disposed and radially spaced magnetic plates extending outwardly from said upper end of said hollow funnel portion for selective magnetic engagement with the lower end of the oil pan around the drain plug and the oil drain opening thereof;

said hollow funnel portion having a horizontally disposed and semi-circular slot, having an upper end, a lower end, a first side and a second side, extending into said hollow funnel portion below said upper end of said hollow funnel portion;

said semi-circular slot being configured to permit the person draining the oil from the engine oil pan to at least insert the person's thumb and index finger into said slot;

a flexible tubular member positioned in said hollow funnel portion inwardly of said semi-circular slot;

said flexible tubular member having an open outer end, a closed inner end and an interior;

said outer end of said flexible tubular member being secured to said hollow funnel portion so that said open outer end of said flexible tubular member encloses said semi-circular slot to prevent the oil being drained from the engine oil pan from escaping outwardly through said semi-circular slot; and said interior of said flexible tubular member being accessible by way of said semi-circular slot whereby a portion of said flexible tubular member may be physically moved in said hollow funnel portion by a person inserting a portion of the person's hand thereinto to grasp the drain plug without coming into direct contact with the drain plug to remove the drain plug from the drain opening in the oil pan and so that oil draining from the drain opening, after the drain plug has been removed from the drain opening, will not come into direct contact with the person's fingers or hand as the draining oil passes downwardly through said hollow funnel portion.

6. The oil funnel of claim 5 wherein said hollow funnel portion and said flexible tubular member are comprised of a plastic material.

7. The oil funnel of claim 5 wherein said magnetic plates may be embedded in a plastic material.

8. The oil funnel of claim 5 wherein a horizontally disposed and perforated screen is positioned in said hollow funnel portion below said semi-circular slot to catch the drain plug after it has been removed from the drain opening.

9. In combination:
   an automotive engine oil pan has an aluminum oil pan with a bottom which has a drain plug selectively removably secured to a drain opening formed in the bottom thereof;
   a plurality of radially spaced-apart metal discs secured to said bottom of said oil pan around said drain opening;
   each of said metal discs being magnetic attractive;
   an upstanding and truncated conical-shaped hollow funnel portion having an open lower end and an open upper end;
   said hollow funnel portion having a horizontally disposed and semi-circular slot, having an upper end, a lower end, a first side and a second side, extending into said hollow funnel portion below said upper end of said hollow funnel portion;
   said semi-circular slot being configured to permit the person draining the oil from the engine oil pan to at least insert the person's thumb and index finger into said slot;
   a flexible tubular member positioned in said hollow funnel portion inwardly of said semi-circular slot;
   said flexible tubular member having an open outer end, a closed inner end and an interior;
   said outer end of said flexible tubular member being joined to said upper end, said lower end, said first side and said second side of said semi-circular slot; and
   said interior of said flexible tubular member being accessible by way of said semi-circular slot whereby a portion of said flexible tubular member may be physically moved in said hollow funnel portion by a person inserting a portion of the person's hand thereinto to grasp the drain plug without coming into direct contact with the drain plug to remove the drain plug from the drain opening in the oil pan and so that oil draining from the drain opening, after the drain plug has been removed from the drain opening, will not come into direct contact with the person's fingers or hand as the draining oil passes downwardly through said hollow funnel portion.

10. The oil funnel of claim 9 wherein said hollow funnel portion and said flexible tubular member are comprised of a plastic material.

11. The oil funnel of claim 9 wherein said magnetic plates may be embedded in a plastic material.

12. The oil funnel of claim 9 wherein a horizontally disposed and perforated screen is positioned in said hollow funnel portion below said semi-circular slot to catch the drain plug after it has been removed from the drain opening.

* * * * *